United States Patent
Kapadia et al.

(10) Patent No.: US 9,513,970 B2
(45) Date of Patent: Dec. 6, 2016

(54) OPTIMIZING HANDLING OF VIRTUAL MACHINE MOBILITY IN DATA CENTER ENVIRONMENTS

(71) Applicant: Cisco Technology, Inc., San Jose, CA (US)

(72) Inventors: Shyam Kapadia, Santa Clara, CA (US); Ming Zhang, San Jose, CA (US); Chengelpet V. Ramesh, San Jose, CA (US); Nilesh Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 249 days.

(21) Appl. No.: 13/781,911

(22) Filed: Mar. 1, 2013

(65) Prior Publication Data

US 2014/0250220 A1     Sep. 4, 2014

(51) Int. Cl.
| | |
|---|---|
| *G06F 15/173* | (2006.01) |
| *G06F 9/50* | (2006.01) |
| *G06F 9/455* | (2006.01) |
| *H04L 12/46* | (2006.01) |
| *H04L 29/12* | (2006.01) |

(52) U.S. Cl.
CPC ......... *G06F 9/5077* (2013.01); *G06F 9/45558* (2013.01); *H04L 12/4625* (2013.01); *G06F 2009/4557* (2013.01); *H04L 61/103* (2013.01); *H04L 61/2015* (2013.01); *H04L 61/2084* (2013.01)

(58) Field of Classification Search
CPC ............................... H04L 49/70; G06F 9/4533
USPC .................................................. 709/217, 214
See application file for complete search history.

(56) References Cited

U.S. PATENT DOCUMENTS

| | | | |
|---|---|---|---|
| 7,076,251 B2 | 7/2006 | Jagadeesan et al. | |
| 7,903,647 B2* | 3/2011 | Kanekar et al. | 370/389 |
| 8,260,904 B2* | 9/2012 | Nelson | 709/223 |
| 8,510,372 B2* | 8/2013 | Toumura | 709/203 |
| 8,718,071 B2* | 5/2014 | Li et al. | 370/397 |
| 9,014,184 B2* | 4/2015 | Iwata et al. | 370/389 |
| 2011/0093849 A1* | 4/2011 | Chawla et al. | 718/1 |
| 2011/0238820 A1* | 9/2011 | Matsuoka | 709/224 |
| 2011/0320577 A1 | 12/2011 | Bhat et al. | |
| 2012/0185856 A1* | 7/2012 | Ashihara et al. | 718/1 |
| 2012/0275328 A1* | 11/2012 | Iwata et al. | 370/252 |
| 2012/0331142 A1* | 12/2012 | Mittal et al. | 709/225 |
| 2013/0007196 A1* | 1/2013 | Alfano et al. | 709/217 |
| 2013/0024553 A1 | 1/2013 | Mittal et al. | |
| 2013/0034015 A1 | 2/2013 | Jaiswal et al. | |

(Continued)

OTHER PUBLICATIONS

International Search Report and Written Opinion in counterpart International Application No. PCT/US2014/018202, mailed May 22, 2014, 8 pages.

*Primary Examiner* — Umar Cheema
*Assistant Examiner* — Tesfu Mekonen
(74) *Attorney, Agent, or Firm* — Edell, Shapiro & Finnan, LLC

(57) ABSTRACT

Techniques are provided for sending address information of virtual machines to a physical switch. A migration of a virtual machine to a physical server is detected. The physical server obtains address information of the virtual machine, and upon obtaining the address information of the virtual machine, the physical server sends the address information to a first physical switch that is connected to the physical server.

21 Claims, 4 Drawing Sheets

(56) References Cited

U.S. PATENT DOCUMENTS

2014/0140244 A1\* 5/2014 Kapadia et al. ............. 370/255
2014/0169154 A1\* 6/2014 Chen et al. .................. 370/219

\* cited by examiner

OPTIMIZING HANDLING OF VIRTUAL MACHINE MOBILITY IN DATA CENTER ENVIRONMENTS

TECHNICAL FIELD

The present disclosure relates to obtaining and forwarding address information associated with virtual machines in a network environment.

BACKGROUND

Physical servers in a network may be located in a rack unit that houses a plurality of servers. The physical servers may connect to a top of rack (ToR) switch that routes communications between the servers as well as to other external network elements. Additionally, the physical servers may be configured to host one or more virtual machines that may be arranged in one or more virtual networks or subnets. Upon joining the network, the virtual machines are assigned context identifiers, such as an Internet Protocol (IP) address and subnet. The physical servers may also be configured to host corresponding virtual switches and a virtual supervisor module. The virtual switches enable data communications between local virtual machines. In addition, the virtual switches need to obtain the context identifiers of the virtual machines to route communications between the virtual machines to external entities via the directly attached ToR switch.

DESCRIPTION OF EXAMPLE EMBODIMENTS

Overview

Techniques are provided for sending address information of virtual machines to a physical switch. A migration of a virtual machine to a physical server is detected. The physical server obtains address information of the virtual machine, and upon obtaining the address information of the virtual machine, the physical server sends the address information to a first physical switch that is connected to the physical server. The first physical switch can then share that address information with other physical switches in the network.

Example Embodiments

Figure 1:
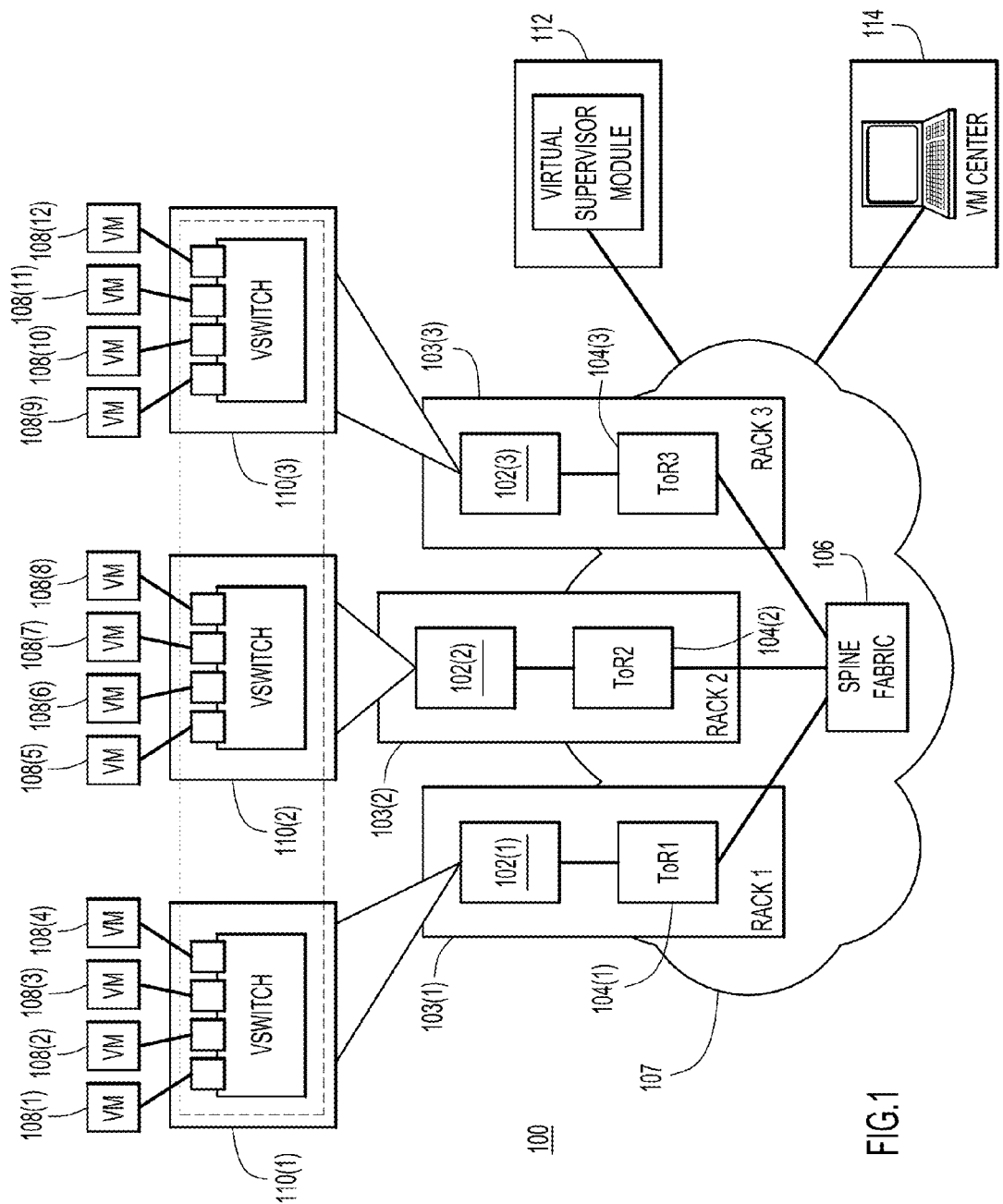
FIG. 1 shows an example system or network topology including a plurality of virtual machines hosted by a plurality of physical servers, each of which is configured to send address information to corresponding Top of Rack (ToR) switches.

The techniques presented herein involve sending address information of virtual machines to corresponding physical switches in a network. An example network system/topology (hereinafter "network") is shown at reference numeral 100 in FIG. 1. The network 100 comprises a plurality of physical servers ("servers") shown at reference numerals 102(1)-102(3). The physical servers may be housed in one or more rack units or "racks." The racks are shown at reference numerals 103(1), 103(2) and 103(3). Rack 103(1) is also referred to as "Rack 1," rack 103(2) is also referred to as "Rack 2," and so on. In one example, as shown in FIG. 1, physical server 102(1) is housed in Rack 1, physical server 102(2) is housed in Rack 2 and physical server 102(3) is housed in Rack 3. Though FIG. 1 shows only one physical server in each of the racks 103(1)-103(3), it should be appreciated that the racks may have more than one physical server.

Each of the racks 103(1)-103(3) also has a switch device ("switch" or "Top of Rack (ToR) switch"), shown at reference numerals 104(1), 104(2) and 104(3). Note that a pair of ToR switches may be used per rack to provide redundancy and fault-tolerance. The ToR switches 104(1), 104(2) and 104(3) each resides in a corresponding one of the racks 103(1)-103(3). For example, in FIG. 1, ToR switch 104(1) resides in Rack 1, ToR switch 104(2) resides in Rack 2 and ToR switch 104(3) resides in Rack 3. The ToR switches 104(1)-104(3) are configured to manage communications within a rack unit and also to communicate with ToR switches residing in other rack units. Additionally, the ToR switches 104(1)-104(3) are configured to communicate with a network controller unit ("network controller"), shown at reference numeral 106. For example, ToR switch 104(1) is configured to manage communications from server 102(1) and is also configured to communicate with ToR switches 104(2) and 104(3) via the network controller 106 in a "spine fabric" network 107. It should be appreciated that the topology in FIG. 1 is shown merely as an example, and any number of racks, servers, switches and network controllers may be present in network 100.

The servers 102(1)-102(3) are physical servers configured to exchange data communications with each other in the network 100. Each of the servers 102(1)-102(3) may be configured to host one or more "virtual" machines ("VMs"). These virtual machines are shown at reference numerals 108(1)-108(12). Virtual machine 108(1) may be referred to as "virtual machine 1" or "VM 1," virtual machine 108(2) may be referred to as "virtual machine 2" or "VM 2," and so on. The servers 102(1)-102(3) may host multiple virtual machines. For example, as shown in FIG. 1, virtual machines 108(1)-108(4) are hosted by server 102(1) (which resides, e.g., in Rack 1), virtual machines 108(5)-108(8) are hosted by server 102(2) (which resides, e.g., in Rack 2) and virtual machines 108(9)-108(12) are hosted by server 102(3) (which resides, e.g., in Rack 3). The corresponding ToR switches are configured to manage (e.g., route) communications between these virtual machines by obtaining and distributing address information associated with these virtual machines, as described herein.

The servers 102(1)-102(3) are also configured to host one or more virtual switches, shown at reference numerals 110(1)-110(3). FIG. 1 shows server 102(1) hosting a first virtual switch 110(1), server 102(2) hosting a second virtual switch 110(2) and server 102(3) hosting a third virtual switch 110(3), though it should be appreciated that any of the servers 102(1)-102(3) may host any number of virtual switches.

FIG. 1 also shows a central configuration manager 112. The central configuration manager 112 may be hosted by any of the physical servers 102(1)-102(3) or another physical device in the network 100. For simplicity, FIG. 1 shows the central configuration manager 112 in communication with the spine fabric network 107. The central configuration manager 112 in FIG. 1 is configured to manage or "supervise" all of the virtual switches 110(1)-110(3), and thus, the central configuration manager 112 is also referred to hereinafter as a Virtual Supervisor Module (VSM). For example, the VSM 112 is a virtual machine that is hosted by a physical server (e.g., one of the physical servers 102(1)-102(3) or another physical device) that has network connectivity with the devices in the network 100. There may be an active VSM and a standby VSM that runs on one of the physical servers for redundancy and for fault-tolerance. The VSM 112, in general, serves as a central entity that manages the various virtual switches 110(1)-110(3) that are hosted by respective servers 102(1)-102(3). The VSM 112 provides a central point of management and interface for the distributed virtual switches. The VSM 112 in FIG. 1 may be hosted by a single physical device to provide an active-standby redundancy model. FIG. 1 also shows a Virtual Machine center unit 114, which may be accessible by a network administrator to instantiate and migrate one or more of the virtual machines 108(1)-108(12) in the network, as described herein.

Upon initial instantiation (activation) of a virtual machine (e.g., when a virtual machine "joins" the network 100), it is assigned a corresponding context identifier. As the virtual machines 108(1)-108(12) are activated and join the network, the corresponding context identifier information may be assigned to them either statically or dynamically. For example, the virtual machines 108(1)-108(12) are assigned a corresponding context identifier that may include an address, such as an Internet Protocol (IP) address (e.g., an IP version 6 (IPv6) address link-local (LL) and an IPv6 global address), a Media Access Control (MAC) address, a port number associated with a VLAN of the virtual machine, etc. The context identifiers may be assigned to the virtual machines 108(1)-108(12) using, for example, a Dynamic Host Configuration Protocol (DHCP).

Once a context identifier is assigned to a virtual machine, the respective virtual switch to which the virtual machine is attached learns about the context identifier based on traffic emanating from that virtual machine. In some cases, it may also be possible for the virtual switch to probe its directly attached virtual machine for this context information. For example, when virtual machines 108(1)-108(4) are instantiated/activated and join the network 100, the virtual switch 110(1) that manages communications for the virtual machines 108(1)-108(4) (e.g., routes communications from and destined for virtual machines 108(1)-108(4)) learns about their context information. Likewise, when virtual machines 108(5)-108(8) are instantiated/activated and join the network 100, virtual switch 110(2) learns their context identifiers, and when virtual machines 108(9)-108(12) are instantiated/activated and join the network 100, virtual switch 110(3) learns their respective context information.

Virtual machines may migrate or be reassigned to different servers based on the load of a particular physical server and other conditions in the network 100. For example, virtual machine 108(1) may be reassigned from server 102(1) to be hosted by server 102(2) based on, e.g., processing capacity of servers 102(1) and 102(2) at a given time, even though servers 102(1) and 102(2) are located in different racks. That is, though virtual machine 108(1) is initially assigned to server 102(1), server 102(1) may later have reduced processing capacity and/or server 102(2) may have increased processing bandwidth. As a result, it may be more operationally efficient for server 102(2) to host virtual machine 108(1) instead of server 102(1). This migration is facilitated through the virtual machine center 114 that will reassign virtual machine 108(1) from server 102(1) to server 102(2).

However, typically, when a virtual machine is reassigned to a different server (e.g., server 102(2)), the ToR switch that manages that different server (e.g., ToR switch 104(2)) may not have the context identifier information associated with the reassigned virtual machine. That is, virtual machine 108(1) may be reassigned from server 102(1) to server 102(2), but the ToR switch 104(2) that manages server 102(2) may not already have the address information of the virtual machine 108(1) in order to enable and route communications to and from the newly reassigned virtual machine.

Existing techniques for providing this information to the ToR switch 104(2) involve the virtual switch 110(2) on server 102(2) sending a request (e.g., a reverse address resolution protocol (RARP) or a gratuitous ARP message) to the ToR switch 104(2) to provide the context identifier information (including address information) of the migrated virtual machine. These techniques, however, are undesirable, because communications sent by and destined for the migrating virtual machine 108(1) may be lost between the time at which the virtual machine 108(1) migrates and the time at which the ToR switch 104(2) receives the context identifier information needed to route the communications appropriately to and from virtual machine 108(1). In one example, when a virtual machine migrates using existing techniques, the virtual switch that is on the new server to which the virtual machine has migrated may send a gratuitous ARP message to the ToR switch associated with the new server, but this gratuitous ARP message may return only an IP version 4 (IPv4) address and a MAC address of the moved virtual machine. However, if the moved virtual machine has an IPv6 address, then the existing techniques will not return the IPv6 address of the moved virtual machine. Additionally, in another example, when a virtual machine migrates using existing techniques, information related only to a MAC address of the virtual machine may be available to the new server, and not other address information.

Since migration of a virtual machine is intended to be transparent to an operating system of a host server, the host operating system does not provide any address information of the migrated virtual machine. That is, these existing techniques may lead to a disruption in network communications sent by and destined for the migrated virtual machine. These disruptions are especially problematic in scenarios where "live migration" of virtual machines is employed. Live migration allows for virtual machines to continue sending and receiving network communications to each other, even as they are moved to a different server in a different rack in the network 100. The techniques presented herein alleviate these concerns by enabling all of the ToR switches to obtain the context identifiers of the virtual machines as they are instantiated/activated and join the network 100 in order to facilitate live migration of virtual machines in the network 100.

Figure 2:
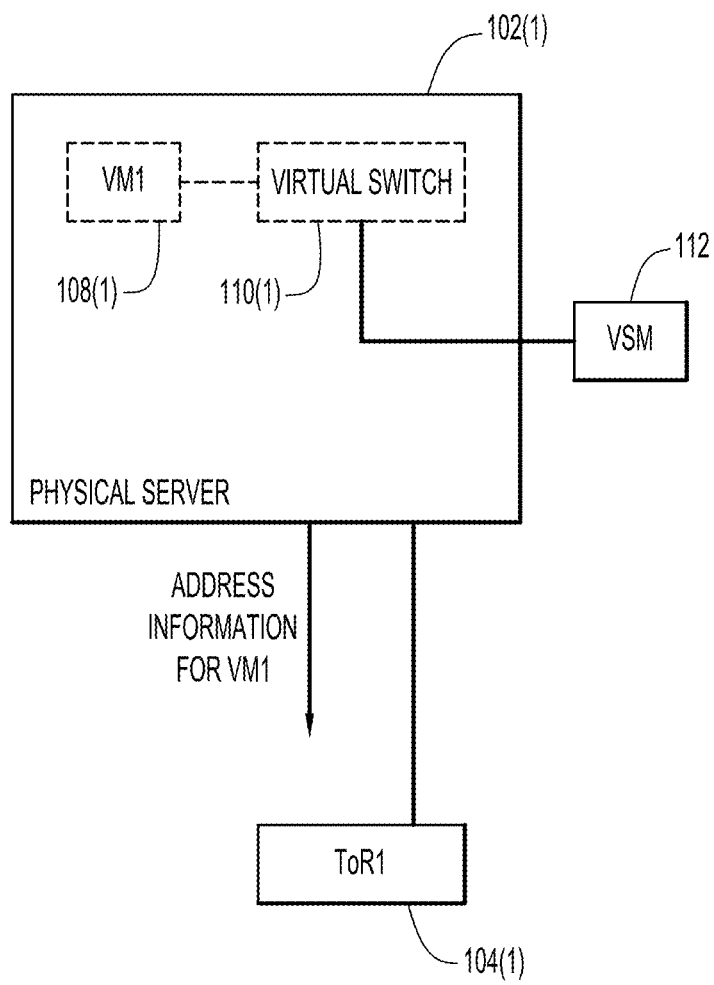
FIG. 2 shows an example topology including virtual switches and a virtual supervisor module hosted by a physical server that sends the address information from the physical server to a ToR switch.

Reference is now made to FIG. 2, which shows an example topology of the server 102(1) and the ToR switch 104(1) ("ToR 1"). The server 102(1) hosts the virtual machine 108(1) ("virtual machine 1" or "VM 1") and the virtual switch 110(1). FIG. 2 also shows the VSM 112. The virtual switch 110(1) of the server 102(1) is configured to manage communications of VM 1. As explained above, in one example, the virtual switch 110(1) is managed by the VSM 112, which may be a virtual machine that is hosted by one of the servers 102(1)-102(3) or another physical device in the network that is not shown in FIG. 2. For simplicity, FIG. 2 shows the server 102(1) hosting only the virtual machine 108(1) and the virtual switch 110(1), and it is assumed in FIG. 2 that the VSM 112 is hosted by another physical device with network connectivity to server 102(1).

In FIG. 2, as VM 1 is instantiated/activated and joins the network 100, it is assigned an address (e.g., an IPv4 or IPv6 address) statically or dynamically via, e.g., a DHCP protocol. Once VM 1 is assigned the address, the address information is learned (e.g., "gleaned") by the virtual switch 110(1), and this address information is sent from the physical server 102(1) to ToR 1 (e.g., using a first-hop protocol). The virtual switch 110(1) then instructs the server 102(1) to send the address information to the ToR switch 104(1). For example, the virtual switch 110(1) can distribute the address information to the ToR switch 104(1) using a proprietary synchronization that is unique to the virtual switch. Additionally, the virtual switch 110(1) may distribute the address information to the ToR switch 104(1) using a Virtual Station Interface (VSI) Discovery Configuration Protocol (VDP) or other suitable protocol. VDP is a protocol to exchange messages between virtual switches on a physical server and physical switches and is used to automatically associate and de-associate a virtual machine in a network. By doing so, the VDP can automate the migration of network states before virtual machines migrate in a network. VDP is a reliable protocol for network devices to communicate address information of directly attached or hosted virtual machines to ToR switches.

The address information may include address information of virtual machines joining the network as well as virtual machines that have migrated within a network, as described herein. The address information can be sent to the ToR switches using protocol specific Neighbor Advertisement (NA) messages from the hosted virtual switch. Thus, in the example shown in FIG. 2, the IPv6 link-local and IPv6 global address information of VM 1 is sent to the ToR switch 104(1) by virtual switch 110(1) as soon as it learns about it. In one example, the NA messages are sent from the VM 1 itself and is used by a ToR switch to learn about VM 1 (e.g., to learn the address information and other context identifier information of VM 1).

Upon receiving the address information for VM 1 from the server 102(1), the ToR switch 104(1) is able to update its routing table to include the address information for VM 1. The ToR switch 104(1) then distributes the address information for VM 1 to other ToR switches that manage other physical servers in different racks. When the other ToR switches receive this address information, they are also able to update their routing tables to include the address information associated with VM 1. For example, the ToR Switch 104(1) distributes the address information to ToR switches 104(2) and 104(3) via the network controller 106 depicted in FIG. 1. Thus, once VM 1 is instantiated and joins the network 100, all of the ToR switches in the network 100 receive the address information of VM 1. As a result, as soon as, or soon after, VM 1 is instantiated and joins the network 100, the ToR switches are able to identify the location of VM 1 in the network.

In addition to being sent to the ToR switches, the address information is sent by the server 102(1) to the physical device that hosts the VSM 112. As described above, the VSM 112 acts as a central entity that manages the virtual switches in the network, and thus the VSM 112 obtains the address information of VM 1 from the virtual switch 110(1) and stores this address information of VM 1 (and other virtual machines) in a database. This address information can be accessed by one or more network devices as virtual machines migrate in the network 100, as described herein. For example, when VM 1 migrates to another physical server other than server 102(1), the virtual switch associated with the new physical server to which the virtual machine has migrated can learn or glean virtual machine address information and other context identifier information from the VSM 112 since the VSM 112 manages the virtual switch hosted by the new physical server. In one example, the VSM 112 is able to provide this information to the virtual switch associated with the new physical server because the VSM 112 has previously registered with the new virtual switch and with the old virtual switch (virtual switch 110(1)) associated with physical server 102(1) that hosted VM 1 prior to its migration.

If VM 1 is later reassigned/migrated to server 102(2), the ToR switches can still route communications sent by and destined for VM 1 during and after the migration without disruption in communications. Using these techniques a virtual machine can undergo live migration in the network to be reassigned to any server in any rack because the ToR switches have already received the appropriate address information for the virtual machine and have updated their routing tables accordingly. Furthermore, by distributing the address information as soon as, or soon after, VM 1 is instantiated and joins the network 100, future live migration or reassignment of VM 1 is ensured in the network 100 without communication disruptions.

Figure 3:
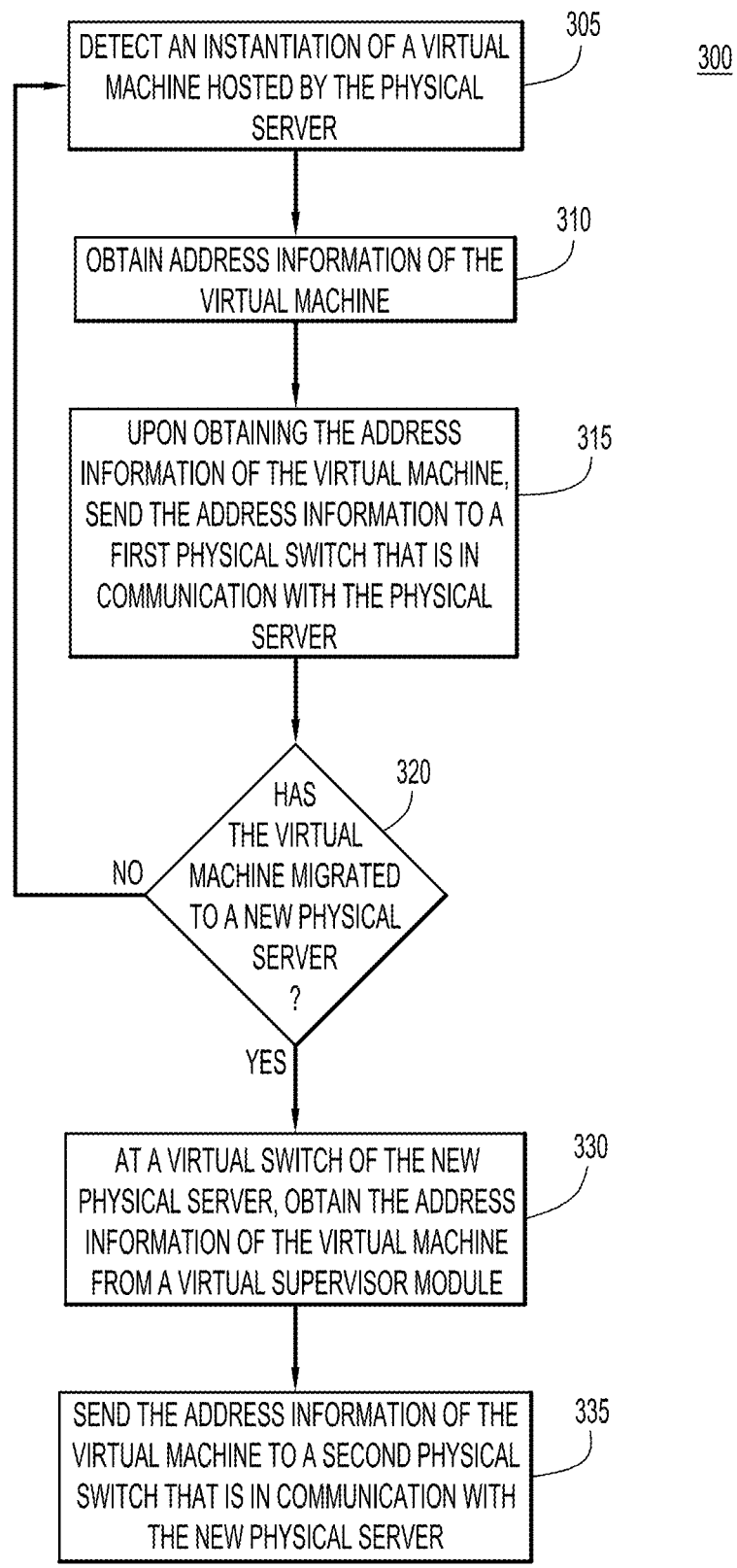
FIG. 3 shows an example flow chart depicting operations performed by the physical server to send address information of virtual machines to a corresponding ToR switch.

Reference is now made to FIG. 3. FIG. 3 shows an example flow chart 300 depicting operations performed by a physical server (e.g., server 104(1)) to send address information of a virtual machine (e.g., VM 1) to a corresponding ToR switch (e.g., ToR switch 104(1)). At 305, the physical server detects an instantiation of a virtual machine hosted by the physical server. For example, the physical server detects the instantiation of the virtual machine when the virtual machine is activated and first joins the network 100. At 310, the physical server obtains address information of the virtual machine, and upon receiving the address information of the virtual machine, the physical server, at 315, sends the address information to a first physical switch that is in communication with the physical server. At 320, a determination is made as to whether the virtual machine has migrated to a new physical server. If not, the process reverts to operation 305. If the virtual machine has migrated to a new physical server, at 330, a virtual switch of the new physical server obtains the address information of the virtual machine from a virtual supervisor module. The virtual supervisor module is in communication with a virtual switch of the physical server from which the virtual machine migrated and is in communication with the new virtual switch of the new physical server. At 335, the address information of the virtual machine is sent to a second physical switch that is in communication with the new physical server. The address information of the virtual machine may be sent to the first physical switch (in operation 315) and the second physical switch (in operation 335) gratuitously by the appropriate physical server that hosts the appropriate virtual switch, for example, by sending a gratuitous ARP messages or other messages. For example, the address information of the virtual machine may be gratuitously sent to the first physical switch and the second physical switch without being prompted by any other device in the network 100 to send the address information to the appropriate physical switches.

In one example, one physical switch may be in communication with both the new physical server and the original physical server from which the virtual machine has migrated. That is, in the flow chart in FIG. 3, the first physical switch and the second physical switch may be the same physical switch. For example, this physical switch may be in communication with ("connected to") the original physical server via a first port of the physical switch and may be in communication with or connected to the new physical server via a second port of the physical switch. In this example, the physical switch first receives the address information of the virtual machine from the original physical server and associates the address information with the first port. Upon the virtual machine migrating to the new physical server, the new physical server sends the address information of the virtual machine to the same physical switch, and that physical switch updates the address information of the virtual machine to associate the address information of the virtual machine with the second port. That is, the physical switch is able to associate the address information of the virtual machine with one of its ports (e.g., the second port) to which the new physical server is connected.

In another example, after the first physical switch obtains the address information, the first physical switch may then send the address information to a second physical switch (that manages other physical servers) in the network. The second physical switch, thus, may use this address information to identify the location of the virtual machine in the network upon the virtual machine moving or migrating to a different physical server hosted by the second physical switch. The second physical switch may also use the address information of the virtual machine to route communications between the virtual machine in the network and other virtual machines in the network upon the virtual machine moving to the different physical server.

As described above, a virtual switch hosted by a physical server may utilize VDP or another protocol to cause the physical server to send the address information of a hosted virtual machine to a corresponding ToR switch. Additionally, the VSM 112 may be utilized to distribute the address information of virtual machines. For example, since the VSM 112 manages all of the virtual switches 110(1)-110(3) in the network 110, the VSM 112 may synchronize the address information of all of the hosted virtual machines 108(1)-108(12) on all of the servers 102(1)-102(3) between the virtual switches 110(1)-110(3). That is, the VSM 112 may obtain address information for each of the virtual machines 108(1)-108(12) via their respective virtual switches and may distribute the address information of all the virtual machines 108(1)-108(12) to all of the virtual switches 110(1)-110(3). In one example, this information is distributed to all of the virtual switches in the network 100, but only the virtual switch that is associated with the physical server that hosts a virtual machine at a particular moment distributes this information to a ToR Switch associated with the physical server.

Figure 4:
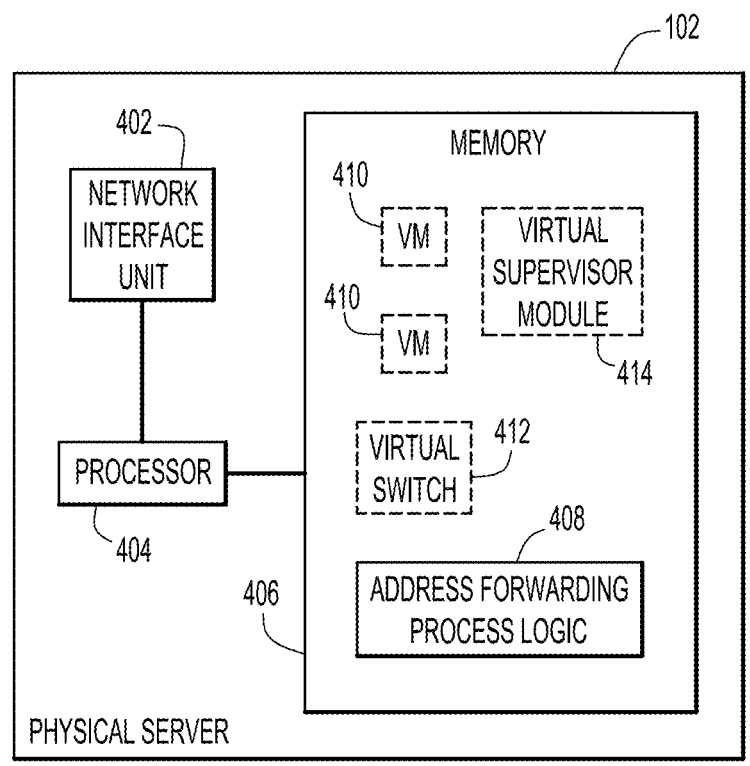
FIG. 4 shows an example block diagram of a physical server configured to obtain address information of a virtual machine and to forward the address information to a ToR switch.

Reference is now made to FIG. 4. FIG. 4 shows a block diagram of a physical server 102 configured to send the address information to the ToR switch. The physical server 102 in FIG. 1 may represent any of the servers 102(1)-102 (3) shown in FIG. 3. For simplicity, the physical server in FIG. 4 is referred to generally as "physical server 102." The physical server 102 has a network interface unit 402, a processor 404 and a memory 406. The network interface unit 402 is configured to receive communications (e.g., packets) from devices in the network 100 and is configured to send communications to devices the network 100. For example, the network interface unit 402 is configured to perform network communications, e.g., to send and receive data packets from other servers and from its corresponding ToR switch. The network interface unit 402 is coupled to the processor 404. The processor 404 is, for example, a microprocessor or microcontroller that is configured to execute program logic instructions (i.e., software) for carrying out various operations and tasks of the physical server 102, as described above. For example, the processor 404 is configured to execute address forwarding process logic 408 to send address information of virtual machines hosted by the physical server 102 to a corresponding ToR switch. The functions of the processor 404 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 406 may comprise read only memory (ROM), random access memory (RAM), magnetic disk storage media devices, optical storage media devices, flash memory devices, electrical, optical, or other physical/tangible (non-transitory) memory storage devices. The memory 406 stores software instructions for the address forwarding process logic 408. The memory 406 also stores logic that enables the physical server 102 to host a plurality of virtual machines (shown at reference numerals 410), a virtual switch (shown at reference numeral 412) and a VSM (shown at reference numeral 414). It should be appreciated that the virtual machines 410 may be any of the virtual machines 108(1)-108(12) shown in FIG. 1, that the virtual switch 412 may be any of the virtual switches 110(1)-110(3) shown in FIG. 1 and that the VSM 414 may be the VSM 112 shown in FIG. 1. Thus, in general, the memory 406 may comprise one or more computer readable storage media (e.g., a memory storage device) encoded with software comprising computer executable instructions and when the software is executed (e.g., by the processor 404) it is operable to perform the operations described for the address forwarding process logic 408.

The address forwarding process logic 408 may take any of a variety of forms, so as to be encoded in one or more tangible computer readable memory media or storage device for execution, such as fixed logic or programmable logic (e.g., software/computer instructions executed by a processor), and the processor 404 may be an application specific integrated circuit (ASIC) that comprises fixed digital logic, or a combination thereof.

For example, the processor 404 may be embodied by digital logic gates in a fixed or programmable digital logic integrated circuit, which digital logic gates are configured to perform the address forwarding process logic 408. In general, the address forwarding process logic 408 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by servers 102(1)-102(3) and the ToR switches 104(1)-104(3) may be performed by one or more computer or machine readable storage media (non-transitory) or device executed by a processor and comprising software, hardware or a combination of software and hardware to perform the techniques described herein.

In summary, a method is provided comprising: detecting a migration of a virtual machine to a physical server; obtaining address information of the virtual machine; and upon obtaining the address information of the virtual machine, sending the address information to a first physical switch that is connected to the physical server.

In addition, an apparatus is provided comprising: a network interface unit configured to enable communications over a network; a memory; and a processor coupled to the network interface unit and the memory and configured to: detect a migration of a virtual machine to a physical server; obtain address information of the virtual machine; and upon obtaining the address information of the virtual machine, send the address information to a first physical switch that is connected to the physical server.

Furthermore, a computer readable storage media is provided that is encoded with software comprising computer executable instructions and when the software is executed operable to: detect a migration of a virtual machine to a physical server; obtain address information of the virtual machine; and upon obtaining the address information of the virtual machine, send the address information to a first physical switch that is connected to the physical server.

The above description is intended by way of example only. Various modifications and structural changes may be made therein without departing from the scope of the concepts described herein and within the scope and range of equivalents of the claims.

What is claimed is:

1. A method comprising:
at a first physical server configured to host a first virtual switch and to connect with a first physical switch in a communication network including a second physical server configured to host a second virtual switch and to connect with a second physical switch:
instantiating a virtual machine;
obtaining, from the virtual machine via the first virtual switch, address information that was assigned to the virtual machine when the virtual machine joined the network and that is used for network communications with the virtual machine, wherein the address information comprises Internet Protocol version 6 (IPv6) link-local address information and IPv6 global address identifier information of the virtual machine;
responsive to the obtaining, sending the address information of the virtual machine from the first virtual switch to the first physical switch and the second physical switch so that the first physical switch and the second physical switch are able to support network communications with the virtual machine during a subsequent live migration of the virtual machine;
after the sending, performing a live migration of the virtual machine from the first physical server to the second physical server during which the virtual machine is able to send and receive network communications with other virtual machines in the network via the first physical switch and the second physical switch as a result of the sending; and
prior to the live migration, synchronizing virtual machine address information across the first virtual switch and the second virtual switch, the synchronizing including, at a virtual supervisor module:
receiving from the first virtual switch address information, including (IPv6) link-local address information and IPv6 global address identifier information, assigned to each of multiple first virtual machines hosted on the first physical server, and
receiving from the second virtual switch address information, including IPv6 link-local address information and IPv6 global address identifier information, assigned to each of multiple second virtual machines hosted on the second physical server; and
distributing to the first virtual switch all of the address information received from all of the multiple first virtual machines and all of the multiple second virtual machines, and
distributing to the second virtual switch all of the address information received from all of the multiple first virtual machines and all of the multiple second virtual machines.

2. The method of claim 1, wherein sending the address information comprises sending the address information to the first physical switch to enable the first physical switch to associate the address information of the virtual machine with one of its ports to which the first physical server is connected before the live migration and to enable the second physical switch to associate the address information of the virtual machine with one of its ports to which the second physical server is connected after the live migration.

3. The method of claim 1, wherein the sending includes sending the address information from the first physical switch to the second physical switch.

4. The method of claim 3, further comprising the second physical switch identifying the location of the virtual machine upon the virtual machine migrating to the second physical server.

5. The method of claim 4, further comprising the second physical switch routing communications between the virtual machine and other virtual machines upon the virtual machine migrating to the second physical server.

6. The method of claim 1, wherein obtaining the address information comprises obtaining the address information from a virtual supervisor module that stores address information for virtual machines.

7. The method of claim 1, wherein the first virtual switch is configured to communicate with the virtual machine and the virtual supervisor module accessible via the network, and wherein:
the obtaining includes, obtaining, by the first virtual switch, the address information from the virtual machine; and
the sending includes sending the address information from the first virtual switch to (i) the first physical switch to be stored therein and for forwarding to the second physical switch, and (ii) the virtual supervisor module to store the address information therein.

8. The method of claim 1, wherein sending the address information comprises sending the address information using a protocol specific gratuitous Neighbor Advertisement message from a virtual switch hosted by the second physical server.

9. A system comprising:
a first physical server configured to host a first virtual switch and to connect with a first physical switch and configured to communicate with a network that includes the first physical server, the first physical switch, a second physical server configured to host a second virtual switch, and a second physical switch connected to the second physical server, the first physical server including: a memory; and a processor coupled to the network interface unit and the memory, and the processor configured to:

instantiate a virtual machine;

obtain, from the virtual machine via the first virtual switch, address information that was assigned to the virtual machine when the virtual machine joined the network and that is used for network communications with the virtual machine, wherein the address information comprises Internet Protocol version 6 (IPv6) link-local address information and IPv6 global address identifier information of the virtual machine;

responsive to obtaining the address information, send the address information of the virtual machine from the first virtual switch to the first physical switch and the second physical switch so that the first physical switch and the second physical switch are able to support network communications with the virtual machine during a subsequent live migration of the virtual machine;

after the sending the address information, perform a live migration of the virtual machine from the first physical server to the second physical server during which the virtual machine is able to send and receive network communications with other virtual machines in the network via the first physical switch and the second physical switch as a result of sending the address information; and a third physical server configured to execute a virtual supervisor module hosted on the third physical server, wherein the virtual supervisor module is configured to communicate with the first virtual switch and the second virtual switch, the virtual supervisor module further configured to, prior to the live migration, synchronize virtual machine address information across the first virtual switch and the second virtual switch, the virtual supervisor module configured to synchronize by:

receiving from the first virtual switch address information, including IPv6 link-local address information and IPv6 global address identifier information, assigned to each of multiple first virtual machines hosted on the first physical server, and receiving from the second virtual switch address information, including IPv6 link-local address information and IPv6 global address identifier information, assigned to each of multiple second virtual machines hosted on the second physical server; and distributing to the first virtual switch all of the address information received from all of the multiple first virtual machines and all of the multiple second virtual machines, and distributing to the second virtual switch all of the address information received from all of the multiple first virtual machines and all of the multiple second virtual machines.

10. The apparatus of claim 9, wherein the processor is further configured to send the address information to the first physical switch to enable the first physical switch to associate the address information of the virtual machine with one of its ports to which the first physical server is connected before the live migration and to enable the second physical switch to associate the address information of the virtual machine with one of its ports to which the second physical server is connected after the live migration.

11. The apparatus of claim 9, wherein the processor is further configured to send the address information using a Virtual Station Interface Discovery Protocol.

12. One or more non-transitory computer-readable storage media encoded with software comprising computer executable instructions and when the software is executed operable on a processor of a first physical server, the first physical server configured to host a first virtual switch and to connect with a first physical switch in a communication network including a second physical server configured to host a second virtual switch and to connect with a second physical switch, to:

instantiate a virtual machine;

obtain, from the virtual machine via the first virtual switch, address information that was assigned to the virtual machine when the virtual machine joined the network and that is used for network communications with the virtual machine, wherein the address information comprises Internet Protocol version 6 (IPv6) link-local address information and IPv6 global address identifier information of the virtual machine;

responsive to obtaining the address information, send the address information of the virtual machine from the first virtual switch to the first physical switch and the second physical switch so that the first physical switch and the second physical switch are able to support network communications with the virtual machine during a subsequent live migration of the virtual machine;

after sending the address information, perform a live migration of the virtual machine from the first to the second physical server during which the virtual machine is able to send and receive network communications with other virtual machines in the network via the first physical switch and the second physical switch as a result of sending the address information; and prior to the live migration, synchronize virtual machine address information across the first virtual switch and the second virtual switch, wherein the instructions to cause the processor to synchronize include instructions to cause the processor to:

receive from the first virtual switch address information, including IPv6 link-local address information and IPv6 global address identifier information, assigned to each of multiple first virtual machines hosted on the first physical server, and receive from the second virtual switch address information, including IPv6 link-local address information and IPv6 global address identifier information, assigned to each of multiple second virtual machines hosted on the second physical server; and distribute to the first virtual switch all of the address information received from all of the multiple first virtual machines and all of the multiple second virtual machines, and distribute to the second virtual switch all of the address information received from all of the multiple first virtual machines and all of the multiple second virtual machines.

13. The non-transitory computer readable storage media of claim 12, wherein the instructions operable to send the address information comprise instructions operable to send the address information to the first physical switch to enable the first physical switch to associate the address information of the virtual machine with one of its ports to which the first physical server is connected before the live migration and to enable the second physical switch to associate the address information of the virtual machine with one of its ports to which the second physical server is connected after the live migration.

14. The non-transitory computer readable storage media of claim 12, further comprising instructions operable to send the address information to the second physical switch to cause the second physical switch to identify a location of the virtual machine upon the virtual machine migrating to the second physical server.

15. The non-transitory computer readable storage media of claim 14, further comprising instructions operable to send the address information to the second physical switch to cause the second physical switch to route communications between the virtual machine and other virtual machines upon the virtual machine migrating to the second physical server.

16. The non-transitory computer readable storage media of claim 12, wherein the instructions operable to send the address information comprise instructions operable to send the address information using a Virtual Station Interface Discovery Protocol.

17. The non-transitory computer readable storage media of claim 12, wherein the instructions operable to send the address information comprises instructions operable to send the address information using a protocol specific gratuitous Neighbor Advertisement message from the virtual switch.

18. The non-transitory computer readable storage media of claim 12, further comprising instructions operable to synchronize the address information between virtual switches via the virtual supervisor module.

19. The method of claim 7, wherein the second server is configured to host a second virtual switch to communicate with the virtual machine and the second physical switch, the method further comprising:
at the second virtual switch, obtaining the address information of the virtual machine from the virtual supervisor module.

20. The apparatus of claim 9, wherein the first virtual switch is configured to communicate with the virtual machine and the virtual supervisor module accessible via the network, and wherein:
the processor is configured to obtain by the first virtual switch, the address information from the virtual machine; and
the processor is configured to send the address information from the first virtual switch to (i) the first physical switch to be stored therein and for forwarding to the second physical switch, and (ii) the virtual supervisor module to store the address information therein.

21. The non-transitory computer-readable storage media of claim 12, wherein the first virtual switch is configured to communicate with the virtual machine and the virtual supervisor module accessible via the network, and wherein:
the instructions operable to obtain include instructions operable to obtain, by the first virtual switch, the address information from the virtual machine; and
the instructions operable to send include instructions operable to send the address information from the first virtual switch to (i) the first physical switch to be stored therein and for forwarding to the second physical switch, and (ii) the virtual supervisor module to store the address information therein.

* * * * *